US008782791B2

(12) United States Patent
Sankruthi (10) Patent No.: US 8,782,791 B2
(45) Date of Patent: Jul. 15, 2014

(54) COMPUTER VIRUS DETECTION SYSTEMS AND METHODS

(75) Inventor: Anand D. Sankruthi, Chennai (IN)

(73) Assignee: Symantec Corporation, Mountain View, CA (US)

( * ) Notice: Subject to any disclaimer, the term of this patent is extended or adjusted under 35 U.S.C. 154(b) by 555 days.

(21) Appl. No.: 12/958,306

(22) Filed: Dec. 1, 2010

(65) Prior Publication Data

US 2012/0144488 A1 Jun. 7, 2012

(51) Int. Cl.
*G06F 21/00* (2013.01)
*H04L 29/06* (2006.01)
*G06F 21/56* (2013.01)

(52) U.S. Cl.
CPC .......... *H04L 63/145* (2013.01); *H04L 63/1416* (2013.01); *H04L 63/1491* (2013.01); *H04L 63/1425* (2013.01); *G06F 21/564* (2013.01)
USPC ........................................................ 726/24

(58) Field of Classification Search
CPC .............. H04L 63/1491; H04L 63/145; H04L 63/1416; G06F 21/564
USPC .................................................... 726/22–25
See application file for complete search history.

(56) References Cited

U.S. PATENT DOCUMENTS

| | | | |
|---|---|---|---|
| 7,188,369 B2 * | 3/2007 | Ho et al. | 726/24 |
| 8,296,848 B1 * | 10/2012 | Griffin et al. | 726/23 |
| 2002/0095598 A1 * | 7/2002 | Camble et al. | 713/200 |
| 2003/0093682 A1 * | 5/2003 | Carmona et al. | 713/187 |
| 2004/0172557 A1 * | 9/2004 | Nakae et al. | 713/201 |
| 2005/0273856 A1 * | 12/2005 | Huddleston | 726/22 |
| 2007/0107052 A1 * | 5/2007 | Cangini et al. | 726/22 |
| 2008/0289042 A1 * | 11/2008 | Bai et al. | 726/24 |
| 2011/0060947 A1 * | 3/2011 | Song et al. | 714/37 |

* cited by examiner

*Primary Examiner* — Lisa Lewis
(74) *Attorney, Agent, or Firm* — Wilmer Cutler Pickering Hale and Dorr LLP (57) ABSTRACT

Systems and methods for computer virus detection are presented. In one embodiment; an computer virus detection method includes: receiving an indication of a change to a file; performing a virus analysis process, including executing the changes to the file in a virtual machine and examining results of the executing the changes; and handling the file based upon the virus analysis. The virus analysis can be performed in a system in which the change to the file occurs. Handling the file can include treating the file as potentially infected with a virus based upon the virus analysis. In one exemplary implementation, examining the results includes comparing the results of executing the changes to the file to other results from executing changes to another file, wherein the file is identified as potentially infected with a virus if the examining results indicates the results of executing the changes to the file are similar to results from executing changes to another file. Examining results includes examining behavior resulting from executing the file (e.g., examining system calls, etc.). Outcome of the examining results can be forwarded for utilization in developing virus data sets.

17 Claims, 12 Drawing Sheets

100

---

110
Receiving an indication of a change to a file.

120
Performing a virus analysis process.

130
Receiving an indication of a change to a file is.

210
Performing a file change execution process.

220
Performing a behavior result examination process.

310
Creating a new first file.

320
Running the first file in a virtual machine and capturing the behavioral traits exhibited by the process.

330
Storing the behavior traits of the first file.

340
Creating a new second file.

350
Running the second file in a virtual machine and capturing the behavioral traits exhibited by the process.

360
Storing the behavior traits of the second file.

---
410
Performing a results comparison process.

---
420
Identifying a file as being potentially infected with a virus if the comparison indicates the resulting behaviors are the same.

---
430
Identifying a file as being OK if the comparison indicates the resulting behaviors are not the same.

710
Performing a virus detection method and forwarding relevant information regarding a potential virus.

720
Performing a virus data set development process utilizing the information received from step 710.

721
Receiving information regarding a file as potentially being infected with a virus.

722
Developing viruses data sets utilizing the information regarding a file as potentially being infected with a virus.

810
Performing a virus data set process.

811
Receiving the virus data set information is received and stored.

812
Utilizing the virus data set information to run a virus scan.

820
Performing an independent virus detection method.

821
Receiving an indication of a change to a file.

822
Performing a virus analysis process.

823
Handling the file based upon the virus analysis.

| 910 |
| --- |
| A change indication receiving module. |
| 920 |
| Virus analysis module. |
| 930 |
| Handling module. |

COMPUTER VIRUS DETECTION SYSTEMS AND METHODS

FIELD OF THE INVENTION

The present embodiments relate to the field of computer virus detection systems and methods.

BACKGROUND OF THE INVENTION

Electronic systems and circuits are often utilized in a number of applications to achieve advantageous results. Numerous electronic technologies such as computers, video equipment, and communication systems facilitate increased productivity and cost reduction in analyzing and communicating information in most areas of business, science, education and entertainment. Frequently, these activities involve storage of vast amounts of important and confidential information and significant resources are expended storing and processing the information. Traditional attempts at protecting the information and computer virus detection can be slow to detect and react to new threats, allowing viruses to adversely impact information and systems during the delayed reaction.

Computer viruses are one of the most prolific and disastrous threats to computer system and information integrity. Conventional approaches can involve potentially significant delays corresponding to relatively long reaction periods associated with developing and disseminating detection information. For example, most traditional approaches wait until a new virus has infected machines, problems are actually noticed and identification information is developed. Unfortunately, the systems and information are usually vulnerable to possible virus infection and malicious attack during this time. Traditional approaches usually include signature data sets and malicious behavior data sets that are developed in centralized facilities and then constantly updated and maintained in the end point systems in an attempt to keep up with new infection or virus threats. When there is a new virus, traditional anti-virus approaches are not typically aware of the potential danger until they get a sample of it, develop a signature for detecting it and update the user's machines with the signatures for detecting the virus. By the time all this occurs, the virus typically could have wreaked havoc. In addition, traditional attempts can also often involve considerable utilization or "consumption" of system and network resources to communicate the signature data sets and behavior data sets.

SUMMARY

Systems and methods for computer virus detection are presented. In one embodiment, a computer virus detection method includes: receiving an indication of a change to a file; performing a virus analysis process, including executing the changes to the file in a virtual machine and examining resulting behavior for comparison to virus indicative behavior; and handling the file based upon the virus analysis. The virus analysis can be performed in a system in which the change to the file occurs. Handling the file can include treating the file as potentially infected with a virus based upon the virus analysis indicating behavior of both the changed file and another file are similar. In one exemplary implementation, examining the results includes comparing the results of executing the changes to the file to other results from executing changes to another file, wherein the file is identified as potentially infected with a virus if the examining results indicates the results of executing the changes to the file are similar to results from executing changes to another file. Examining results can include examining behavior resulting from executing the file. The handling can include treating the file as potentially infected with a virus based upon the virus analysis indicating behavior of the changed file and a process that directed the change are similar. Outcome of the examining results can be forwarded for utilization in developing virus data sets.

In one embodiment, a computer readable storage medium having stored thereon, computer executable instructions that, when executed by a computer system cause the computer system to perform a method comprising: receiving an indication of a change to a file; performing a virus analysis process, including executing the changes to the file in a virtual machine and examining resulting behavior for comparison to virus indicative behavior; and handling the file based upon the virus analysis. The virus analysis can be performed in a system in which the change to the file occurs. Handling the file can include treating the file as potentially infected with a virus based upon the virus analysis indicating behavior of both the changed file and another file are similar. In one exemplary implementation, examining the results includes comparing the results of executing the changes to the file to other results from executing changes to another file, wherein the file is identified as potentially infected with a virus if the examining results indicates the results of executing the changes to the file are similar to results from executing changes to another file. Examining results can include examining behavior resulting from executing the file. The handling can include treating the file as potentially infected with a virus based upon the virus analysis indicating behavior of the changed file and a process that directed the change are similar. Outcome of the examining results can be forwarded for utilization in developing virus data sets.

In one embodiment, a computer system, includes: a computer system having a processor coupled to a computer readable storage media and executing computer readable code which causes the computer system to perform operations including: receiving an indication of a change to a file; performing a virus analysis process, including executing the changes to the file in a virtual machine and examining resulting behavior for comparison to virus indicative behavior; and handling the file based upon the virus analysis. The virus analysis can be performed in a system in which the change to the file occurs. Handling the file can include treating the file as potentially infected with a virus based upon the virus analysis indicating behavior of both the changed file and another file are similar. In one exemplary implementation, examining the results includes comparing the results of executing the changes to the file to other results from executing changes to another file, wherein the file is identified as potentially infected with a virus if the examining results indicates the results of executing the changes to the file are similar to results from executing changes to another file. Examining results can include examining behavior resulting from executing the file. The handling can include treating the file as potentially infected with a virus based upon the virus analysis indicating behavior of the changed file and a process that directed the change are similar. Outcome of the examining results can be forwarded for utilization in developing virus data sets.

DESCRIPTION OF THE DRAWINGS

The accompanying drawings, which are incorporated in and form a part of this specification, are included for exemplary illustration of the principles of the present embodiments and not intended to limit the present invention to the particular implementations illustrated therein. The drawings are not to scale unless otherwise specifically indicated.

DETAILED DESCRIPTION

Reference will now be made in detail to the preferred embodiments, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope as defined by the appended claims. Furthermore, in the following detailed description, numerous specific details are set forth in order to provide a thorough understanding. However, one ordinarily skilled in the art will understand that the present invention may be practiced without these specific details. In other instances, well known methods, procedures, components, and circuits have not been described in detail as not to unnecessarily obscure aspects of the current invention.

Systems and methods that facilitate efficient and effective computer virus detection on a computer system are presented. The systems and methods can be utilized in a variety of different architectures and environments (e.g, including end use or end point systems). In one embodiment, present virus mitigation involves capturing the behavioral traits exhibited by each process or file under scan after a change or modification and comparing the results. If the behavior results are the same or similar, the presumption is the changes or modifications involve a virus or malicious infection and the process or file is identified as potentially being infected with a virus. The reason for making this presumption is because it is highly unlikely that legitimate changes to two different files will produce the same results (e.g., will start to exhibit the same behavior, system calls, etc. in response to two difference changes). For example, a first valid or legitimate change to a first file and a second valid or legitimate change to a second file are expected to produce different behavioral results since it is highly unlikely a legitimate first change and legitimate second change would produce the same behavior results (e.g., same sequence or pattern of system calls, etc.).

Figure 1:
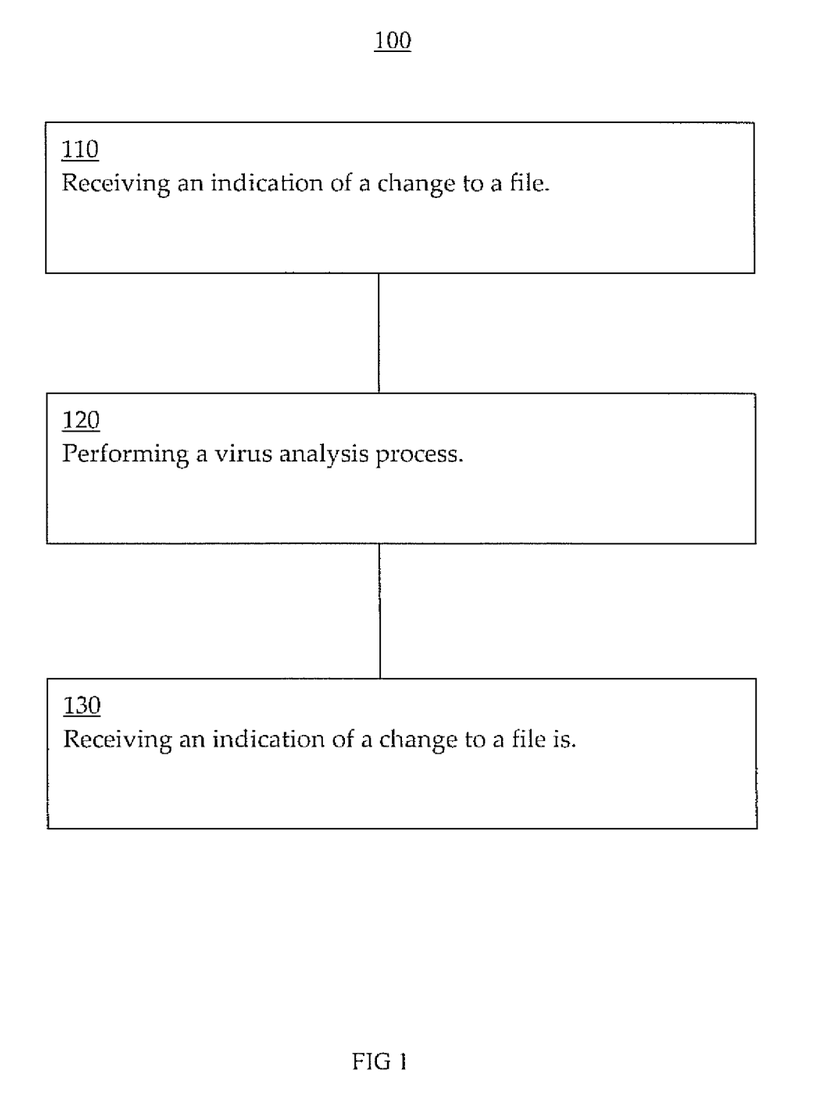
FIG. 1 is a block diagram of an exemplary computer virus detection method in accordance with one embodiment of the present invention.

FIG. 1 is a block diagram of an exemplary computer virus detection method 100 in accordance with one embodiment of the present invention. Computer virus detection method 100 can be independently implemented with no or minimal reliance on information from external sources. In one embodiment, computer virus detection method 100 is implemented in an end use system with no or minimal reliance on information (e.g., virus signature data set, behavior data sets, etc.) from external centralized sources.

In block 110, an indication of a change to a file is received. In one embodiment, events or activities in the system are monitored. In one exemplary implementation, notification is received from features of an operating system (e.g., global index, a search function, etc.).

In block 120, a virus analysis process is performed. In one embodiment, the virus analysis process includes executing the changes to the file in a virtual machine and examining resulting behavior for comparison to virus indicative behavior. In one exemplary implementation, when a file is changed, notification that it is changed is received, and the whole of the file is executed. If there is a previously stored behavior set for this file, the current behavior is compared with the previously stored behavior set. The changed behavior is extracted. The behavior after executing the whole file is saved as the base behavior, which can be used as a basis for comparison if there are further changes to the file.

In one embodiment, the virus analysis is performed in a system in which the change to the file occurs. The virus analysis can be performed in an end point or end use system in which the change to the file occurs. The virus analysis can include comparing the behavior results from executing the changes to the file to behavior results from executing changes to another file, wherein the file is identified as potentially infected with a virus if the examining results indicates the behavior results of executing the changes to both files are the same or similar. The behavior results can include patterns or sequences of system calls. Additional description of virus analysis processes are set forth in following portions of the detailed description.

In one embodiment, the virus analysis process can include executing a process and examining results of executing the process. In one exemplary implementation, if a process changes a file and the file begins (e.g., when the file is executed in a virtual machine) to exhibit behavior the same as or similar to the process that changed the file, the file is identified as potentially infected with a virus.

In block 130, the file is handled based upon the virus analysis. In one embodiment, the changes to the file are permitted to proceed normally if the virus analysis indicates the file is not infected. In one embodiment, the file is treated as potentially infected with a virus if the virus analysis indicates the file is infected with a virus. In one exemplary implementation, the file is removed or quarantined if virus analysis indicates the file is infected with a virus. In one embodiment, handling the file includes forwarding relevant potential virus information to an external system (e.g., a centralized system, etc.). Additional description of handling virus file information is set forth in following portions of the detailed description. Handling the file can include treating the file as potentially infected with a virus based upon the virus analysis indicating behavior of both the changed file and another file are similar. The handling can include treating the file as potentially infected with a virus based upon the virus analysis indicating behavior of the changed file and a process that directed the change are similar.

Figure 2:
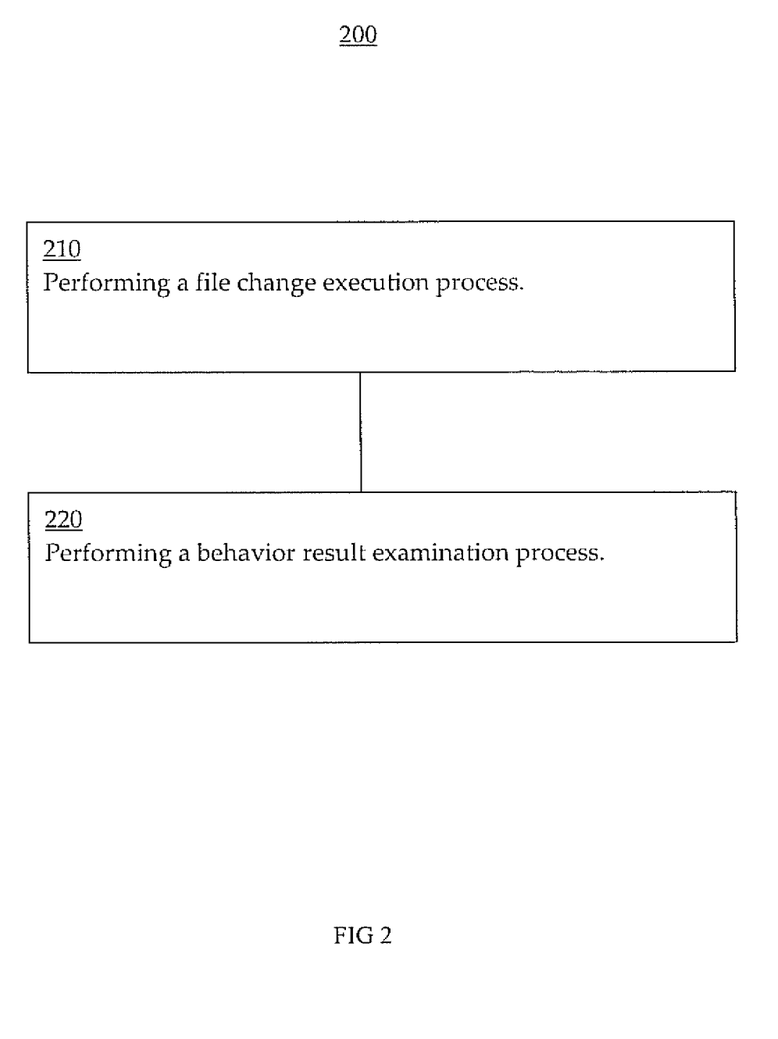
FIG. 2 is a block diagram of an exemplary virus analysis process in accordance with one embodiment of the present invention.

FIG. 2 is a block diagram of virus analysis process 200 in accordance with one embodiment of the present invention. In one embodiment, virus analysis process 200 can be utilized as a virus analysis process of block 120.

In block 210, a file change execution process is performed. The changes are executed and resulting behaviors are extracted. When there is a modification or change to a file, a file including changes or modifications are run in a virtual machine and the behavioral traits (e.g., behavioral pattern, sequence of system calls, etc.) exhibited by the process are captured. Machine learning techniques can be employed to capture behavior. In one exemplary implementation, the WEKA machine learning tool can be utilized to capture behavior. The tool helps users to create behavioral patterns for a process. The pattern can be stored and compared with other behavioral traits from before the change. Differences in the behavioral traits (e.g., behavioral pattern, sequence of system calls, etc.) after the change or modification from behavioral traits before the change or modification are extracted out. The extracted out differences in the behavioral traits (e.g., behavioral pattern, sequence of system calls, etc.) after the change or modification from behavioral traits before the change or modification are stored in the database.

In block 220, a behavior result examination process is performed. If behavioral results of executing the changes in block 210 indicate that behavioral changes in a first file after a modification or change are the same or similar to behavioral changes or modifications in second file after a modification or change the file is identified as potentially being infected by a virus. Additional description of behavior result examination processes are set forth in following portions of the detailed description.

Figure 3:
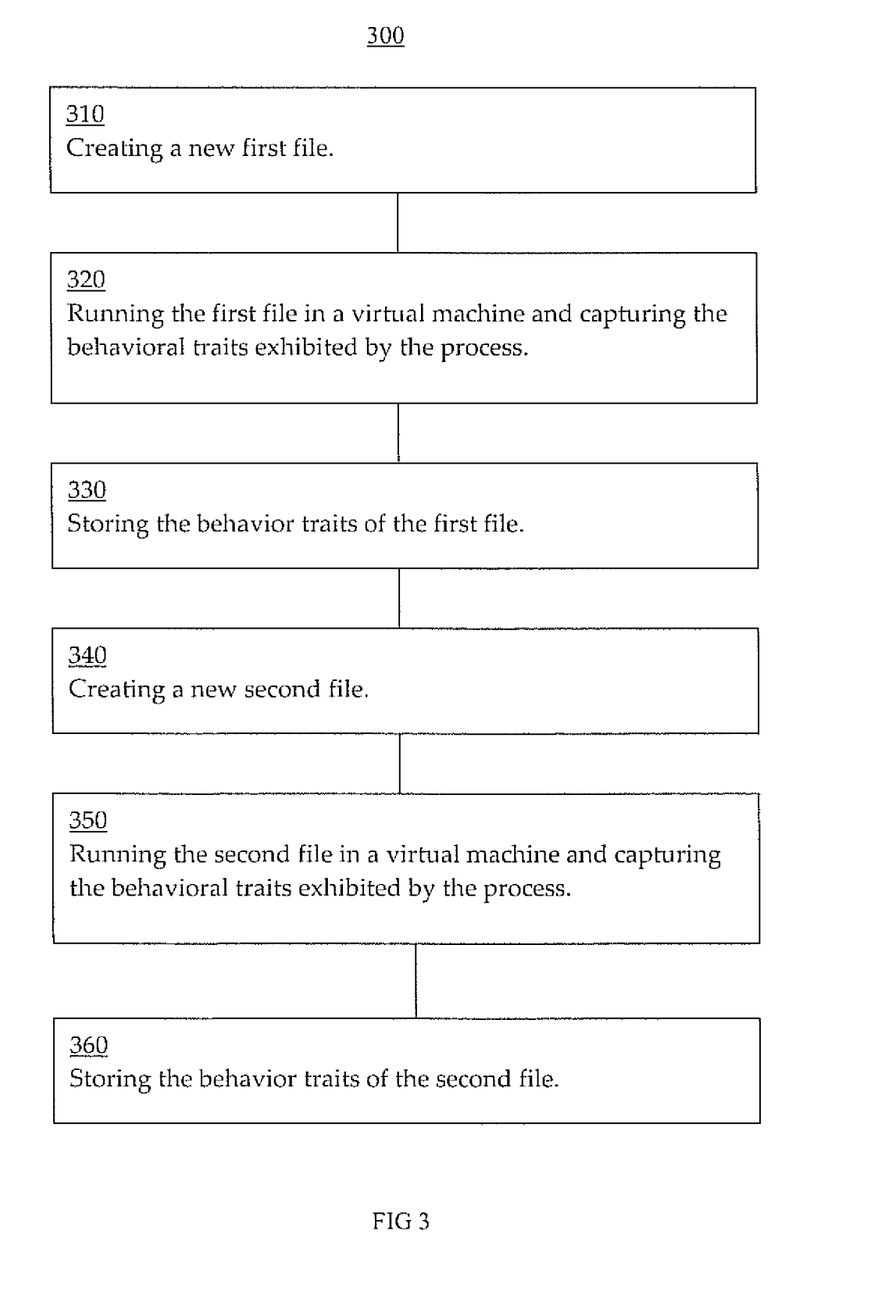
FIG. 3 is a block diagram of an exemplary file change execution process in accordance with one embodiment of the present invention.

FIG. 3 is a block diagram of file change execution process 300 in accordance with one embodiment of the present invention. In block 310 a new first file (e.g., a new called file1A) is created. The new first file can be a copy of a file on another part of the system. In block 320 the first file is run in a virtual machine and the behavioral traits (e.g., behavioral pattern, sequence of system calls, etc.) exhibited by the process are captured. In block 330 the behavior traits of the first file are stored. The behavior traits can be stored in a variety of configurations (e.g., a data set, a database, etc). In block 340 a new second file (e.g., a new called file2B) is created. The second file can be the results of a change or modification to another existing file. In block 350 the second file is run in a virtual machine and the behavioral traits (e.g., behavioral pattern, sequence of system calls, etc.) exhibited by the process are captured. In block 360 the behavior traits of the second file are stored in a database.

It is appreciated that the behavior can involve a variety of characteristics. In one embodiment, the behavior means changes done in the operational domain of the process and not in the file contents. Thus, even in a polymorphic or a metamorphic virus that changes its opcodes upon each infection it creates, they do not change its behavior in each infection. The present invention can also be compatible with behavior blocking that is directed at facilitating resolution of such infection and can increase a chance of successful detection of the poly-morphic viruses.

Figure 4:
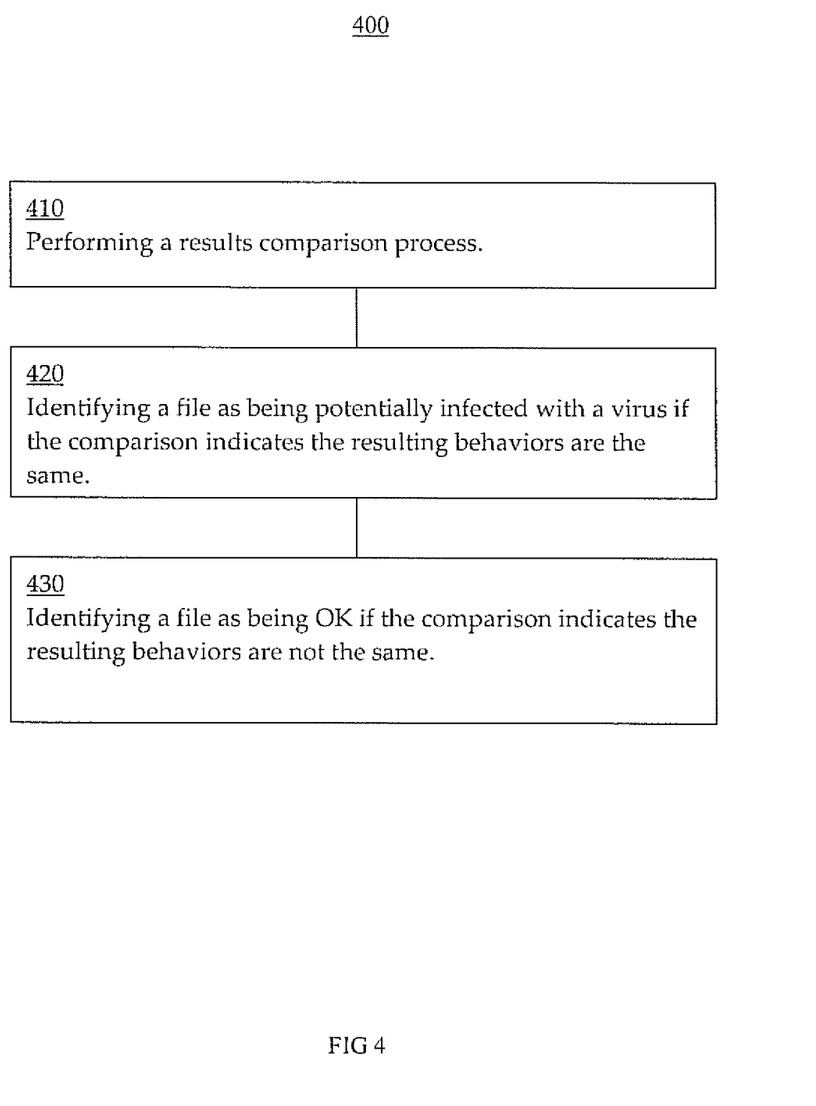
FIG. 4 is a block diagram of an exemplary results examination process in accordance with one embodiment of the present invention.

FIG. 4 is a block diagram of results examination process 400 in accordance with one embodiment of the present invention. In block 410 a results comparison process is performed. In one embodiment, the results comparison process compares changed behavior of a first file to changed behavior of the second file. In one exemplary implementation, a pattern or sequence of system calls are compared. With respect to information from file change execution process 300, the differences or changes in behavior associated with the first file are compared to the differences or changes in behavior associated with the second file to determine if the differences or changes are the same. In block 420, a file is identified as being potentially infected with a virus if the comparison indicates the resulting behaviors are the same. In block 430 a file is identified as being OK if the comparison indicates the resulting behaviors are not the same.

Figure 5A:
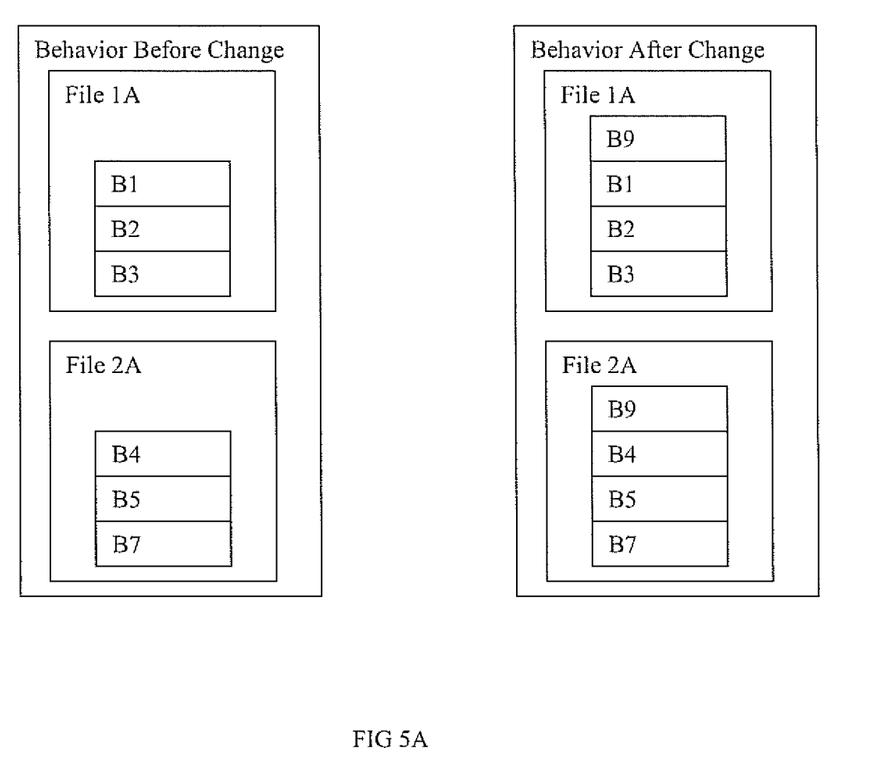
FIG. 5A is a block diagram of exemplary file behavior before and after a change or modification in which behavior is added to the files in accordance with one embodiment of the present invention.

FIG. 5A is a block diagram of files before and after a change or modification in which behavior is added to the files. In FIG. 5A, before a change or modification file 1A includes behavior sequences B1, B2 and B3 and file 2A includes behavior sequences B4, B5, and B6. In one embodiment, each behavior sequence includes a sequence or pattern of system calls. A change or modification causes the same behavior sequence B9 to be added to both the files. After the change or modification file 1A includes behavior sequences B9, B1, B2 and B3 and file 2A includes behavior sequences B9, B4, B5, and B6. Since the same behavior B9 results or occurs in both file 1A and file 2A this is an indication that the files have been infected with a virus (e.g., a virus associated with behavior B9, etc.).

Figure 5B:
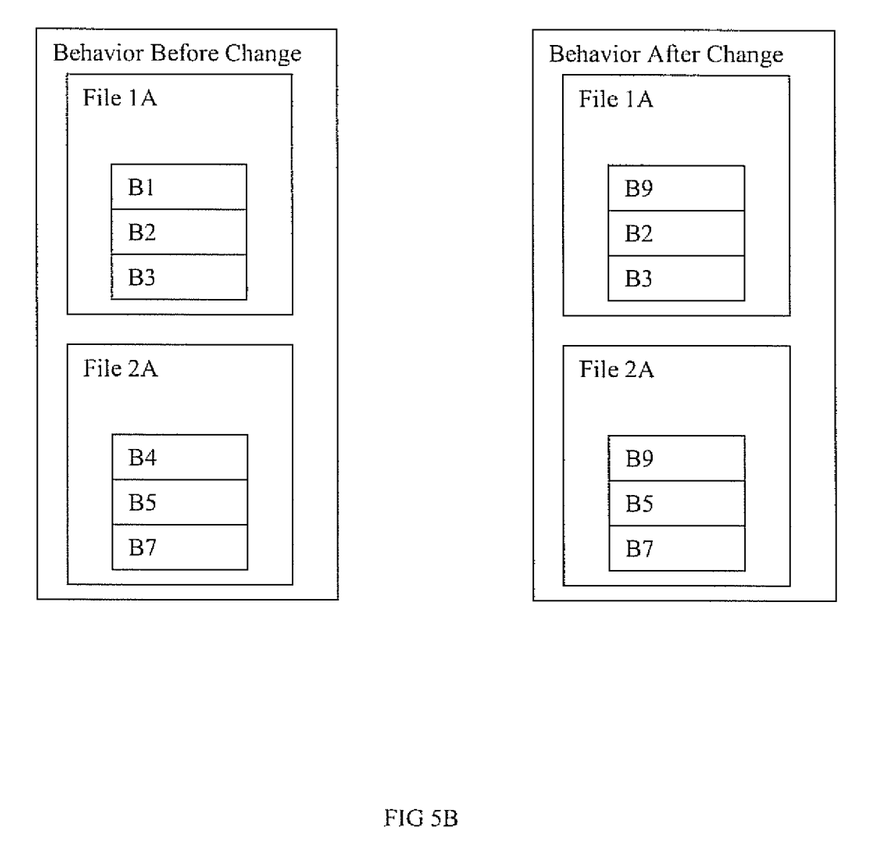
FIG. 5B is a block diagram of exemplary file behavior before and after a change or modification in which behavior is replaced in the files in accordance with one embodiment of the present invention.

FIG. 5B is a block diagram of files before and after a change or modification in which behavior is replaced in the files. In FIG. 5B, before a change or modification file 1A includes behavior sequences B1, B2 and B3 and file 2A includes behavior sequences B4, B5, B6. Again, each behavior sequence can include a sequence or pattern of system calls. A change or modification causes the same behavior sequence B9 to replace a behavior sequence in both files. After the change or modification in file 1A behavior sequence B1 is replaced with behavior sequence B9 and in file 2A behavior sequence B4 is replaced with behavior sequence B9. Since the same behavior B9 results in both file 1A and file 2A this is an indication that the files have been infected with a virus (e.g., a virus associated with behavior B9, etc.)

It is appreciated present systems and methods are also compatible for utilization with conventional virus detection approaches. In one embodiment, the present virus analysis can compliment conventional virus detection approaches. In one embodiment, outcomes of present virus analysis approaches can be forwarded to centralized systems that utilize signature data sets and behavior data sets to facilitate detection of viruses. In one embodiment, present behavior comparison approaches (e.g., method 100, 200, etc.) can be utilized with signature and behavior lookup processes to facilitate effective virus detection. In one exemplary implementation, a system can perform in parallel both the present virus analysis approach (e.g., of examining behavioral results from executing the changes in a virtual machine) and a virus data set detection method (e.g., using lookups in a signature data set, a behavior data set, etc.). Additional description of combined virus detection approaches are described in following portions of the detailed description.

Figure 6:
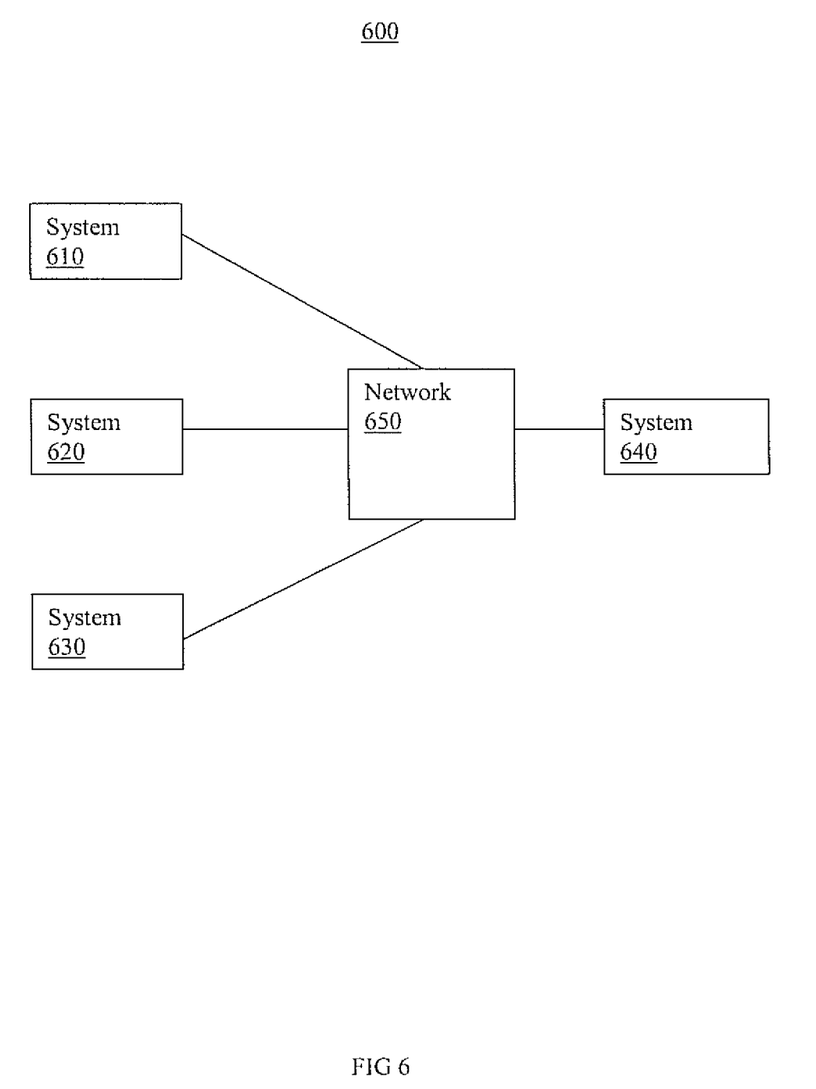
FIG. 6 is a block diagram of an exemplary network on which present systems and methods can be implemented in accordance with one embodiment of the present invention.

FIG. 6 is a block diagram of exemplary network 600 on which present systems and methods can be implemented.

Network 600 includes end use systems 610, 620 and 630, network 650 and centralized system 640. End use systems 610, 620 and 630 are communicatively coupled to network 650 which is communicatively coupled to centralized system 640. Network 650 can communicate information between the end use systems 610, 620 and 630 and centralized system 640.

End use systems 610, 620 and 630 can independently perform computer virus detection methods (e.g., method 100, method 200, etc.) and can forward results of the independent computer virus detection methods to centralized system 640. Centralized system 640 can develop and maintain virus identification data. In one embodiment, centralized system 640 can develop and maintain virus signature data sets and virus behavior data sets. Centralized system 640 can utilize the information received from the end use systems 610, 620 and 640 in the development and maintenance of the virus signature data sets and virus behavior sets.

Figure 7:
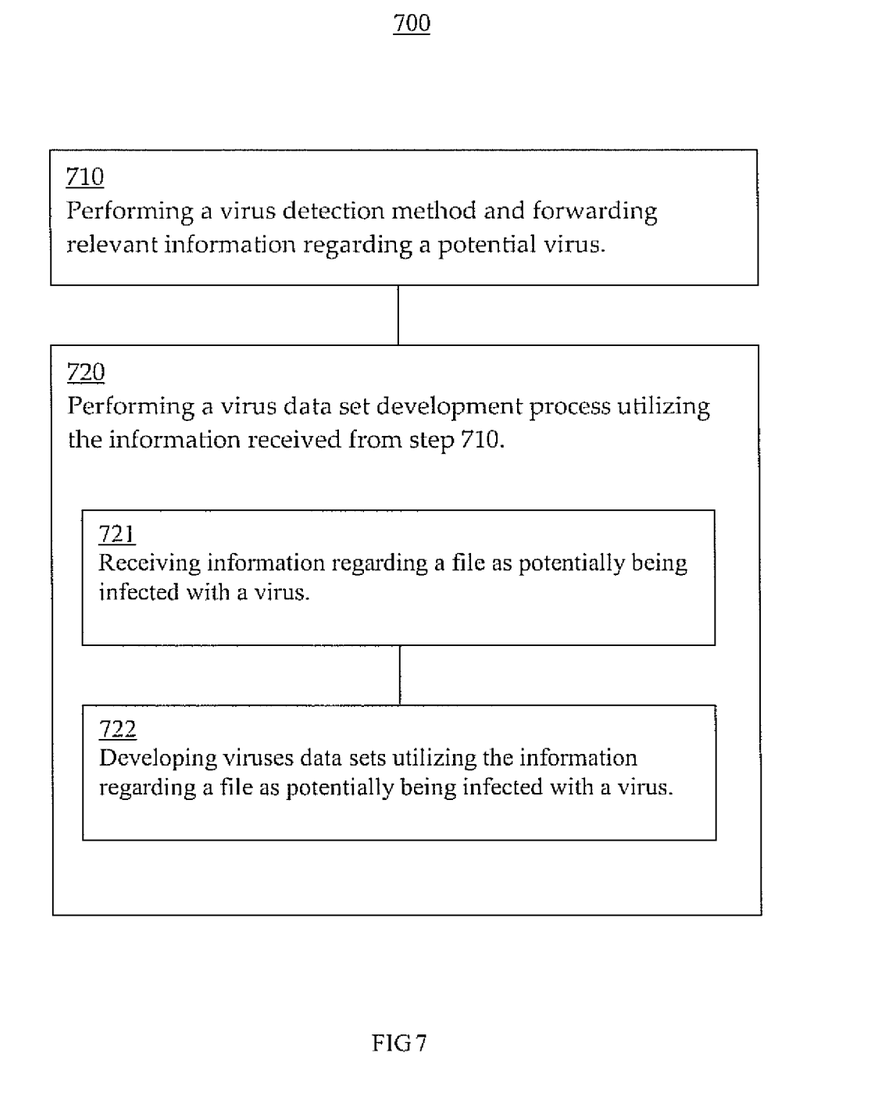
FIG. 7 is a flow chart of an exemplary virus signature development method in accordance with one embodiment of the present invention.

FIG. 7 is a flow chart of virus data set development method 700 in accordance with one embodiment of the present invention. In one embodiment, virus date set development method 700 facilitates updating signature data set and behavior data set information in a centralized system.

In block 710, a computer virus detection method (e.g., method 100, 200, etc.) is performed and relevant information regarding a potential virus is forwarded. In one exemplary implementation, the computer virus detection method is performed in an end use or end point system (e.g., 620). The computer virus detection method can independently identify a file as potentially being infected with a virus and forwards relevant information to centralized system 640. The relevant information can include file name, file size, file contents, detected behavior, etc.

In block 720, a virus data set development process is performed utilizing the information received from step 710. In one embodiment, the virus data set development includes blocks 721 and block 722. In block 721, information is received regarding a file as potentially being infected with a virus. In one exemplary implementation the information is received in a centralized system. The information regarding a file as potentially being infected with a virus is utilized to develop virus data sets. A variety of virus data sets can be developed (e.g., a virus signature data set, a virus behavior data set, etc.). The virus data set information can be maintained in the centralized system and forwarded periodically to the end use systems.

It is appreciated that the virus data set information can be forwarded to other systems. The virus data set information can be forwarded for complimentary and supplementary utilization with otherwise independent virus detection approaches. In one embodiment, a system utilizes both conventional virus data set detection approaches and present invention virus detection approaches. An end use system that is implementing a present computer virus detection method (e.g., 100, 200, etc.) can also implement other virus detection approaches.

It is appreciated there are a variety of scenarios where running combined virus detection methods can offer beneficial features. In one exemplary implementation, an end use system that implements a present detection method (e.g., 100, 200, etc.) can also perform a virus data set detection method. When a system is first started up if there are no changes to the files a pure behavior change approach may have to wait for a change to a file before it could recognize a virus threat, whereas a virus data set detection method may provide an indication (e.g., signature, behavior identification, etc.) that could indentify the possibility of a virus infection without having to wait for a change to a file. When a virus is first introduced to a system through a file change or modification identification of the virus may not have been completely developed and included in a downloaded virus data set and the virus data set approach may not recognize the threat whereas an independent virus diction method would recognize the threat when the file modification is attempted to be introduced. A combined virus detection approach facilitates more flexible and rapid virus detection response to multiple different scenarios.

In one scenario, even through a present virus detection system is activated in a first system (e.g., 620), it may be possible that a file in a first system (e.g., 620) is infected by a virus but there has not been a change to another file to compare it with for the behavior change virus detection approach (e.g., methods 100, 200). In the mean time, in a second system (e.g., 630) there may have been two files infected and when the second system (e.g., 630) performs the behavior change virus detection approach (e.g., methods 100, 200, etc.) it detects the infection. The second system (e.g., 630) can notify a central system (e.g., 640) which can perform a virus data set development process and forward the virus data set information to the first system (e.g., 620). The first system can run a virus data set detection scan and detect the virus even through the active present virus detection In this scenario, the independently running computer virus detection method (e.g., 100, 200, etc.) on the second system (e.g., 630) also helps virus detection on the first system (e.g., 620) even while the first system is independently running it own computer virus detection method (e.g., 1100, 200, etc.).

Figure 8:
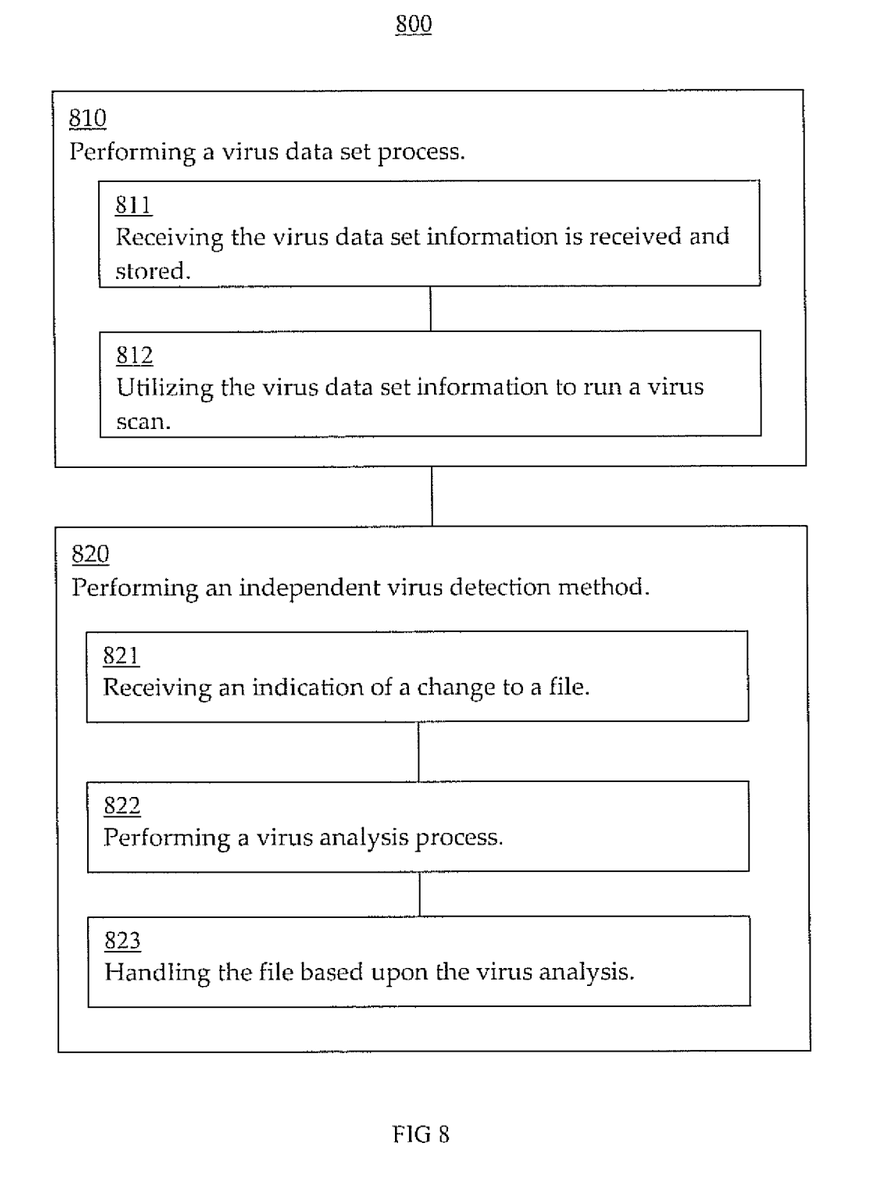
FIG. 8 is a block diagram of an exemplary combined virus detection method in accordance with one embodiment of the present invention.

FIG. 8 is a block diagram of a combined virus detection method in accordance with one embodiment of the present invention. In one embodiment, behavior comparison virus detection methods (e.g., 100, 200, etc.) and virus data set detection methods are performed.

In block 810, a virus data set process is performed. In one embodiment, a virus data set process includes block 811 and block 812. In block 811 the virus data set information is received and stored. In one embodiment, the virus data set information includes virus signature data set information and behavior data set information. The information can be received at a system that is also implementing an independent virus detection method (e.g., 100, 200, etc.). In one exemplary implementation the virus data set information can be forwarded from a centralized system and can be received at an end use system. In block 812, the virus data set information is utilized to run a virus scan. In one embodiment, information in a file is searched for information similar to virus data set information (e.g., signature data set information, behavior data set information, etc.).

In block 820 an independent computer virus detection method is performed. The independent virus detection method can be similar to present computer virus detection methods (e.g., 100, 200, etc.). The independent computer virus detection method can include block 821 and 822. In block 821 an indication of a change to a file is received. In block 822, a virus analysis process is performed. In block 830, the file is handled based upon the virus analysis.

It is appreciated the behavior comparison virus detection methods (e.g., 100, 200, etc.) and virus data set detection methods can be implemented concurrently or in parallel with one another. In one exemplary implementation, the virus data set process of block 810 can be performed sequentially with the independent computer virus detection method of 820. In one exemplary implementation, the virus data set process of block 810 can be performed in parallel with the independent computer virus detection method of 820.

Figure 9:
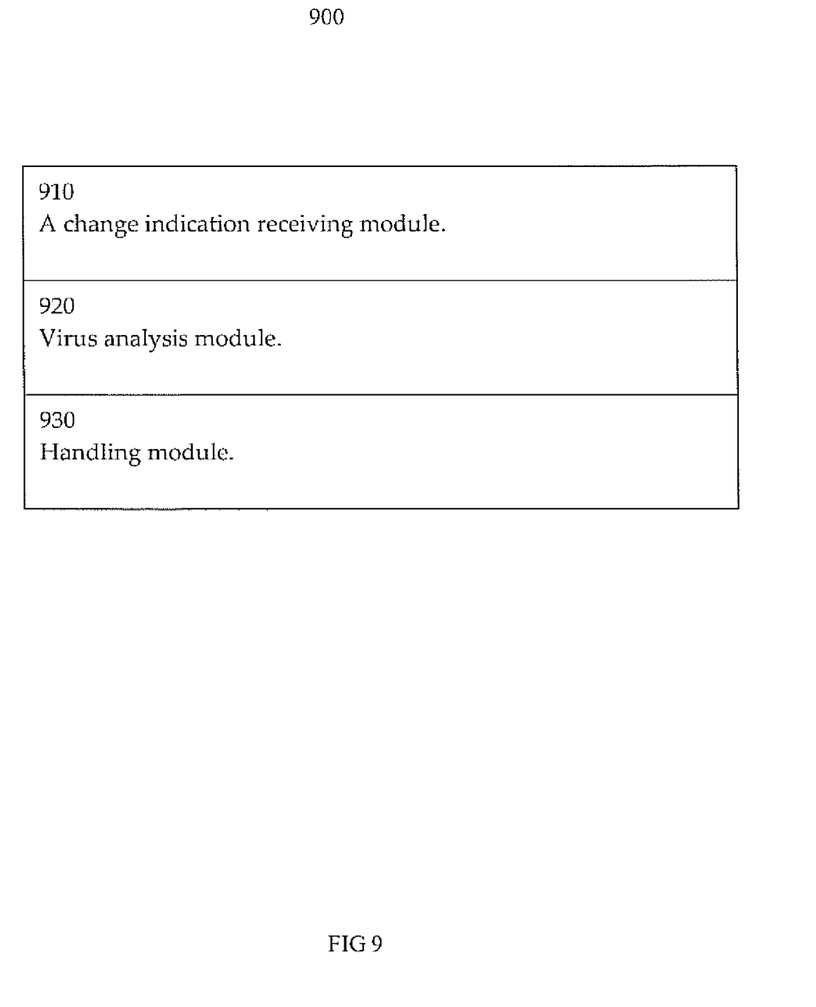
FIG. 9 is a block diagram of an exemplary computer virus detection module in accordance with one embodiment of the present invention.

FIG. 9 is a block diagram of virus detection module 900 which includes instructions for directing a processor in the performance of a computer virus detection method (e.g., computer virus detection method 100, etc.) in accordance with one embodiment of the present invention. Virus detection module 900 includes change indication receiving module 910, virus analysis module 920, and handling module 930. Change indication receiving module 910 includes instructions for receiving an indication of changes or modifications to a file. In one embodiment, change indication receiving module 910 includes instructions for receiving an indication of changes or modifications to a file as indicated in block 110. Virus analysis module 920 includes instructions for executing the changes to the file in a virtual machine and examining results of executing the changes. In one embodiment, virus analysis module 920 includes instructions for virus analysis process includes executing the changes to the file in a virtual machine and examining results of executing the changes as indicated in block 120. Handling module 930 includes instructions for handling a file based upon a virus analysis. In one embodiment, handling module 930 includes instructions for handling a file based upon a virus analysis as indicated in block 130.

Figure 10:
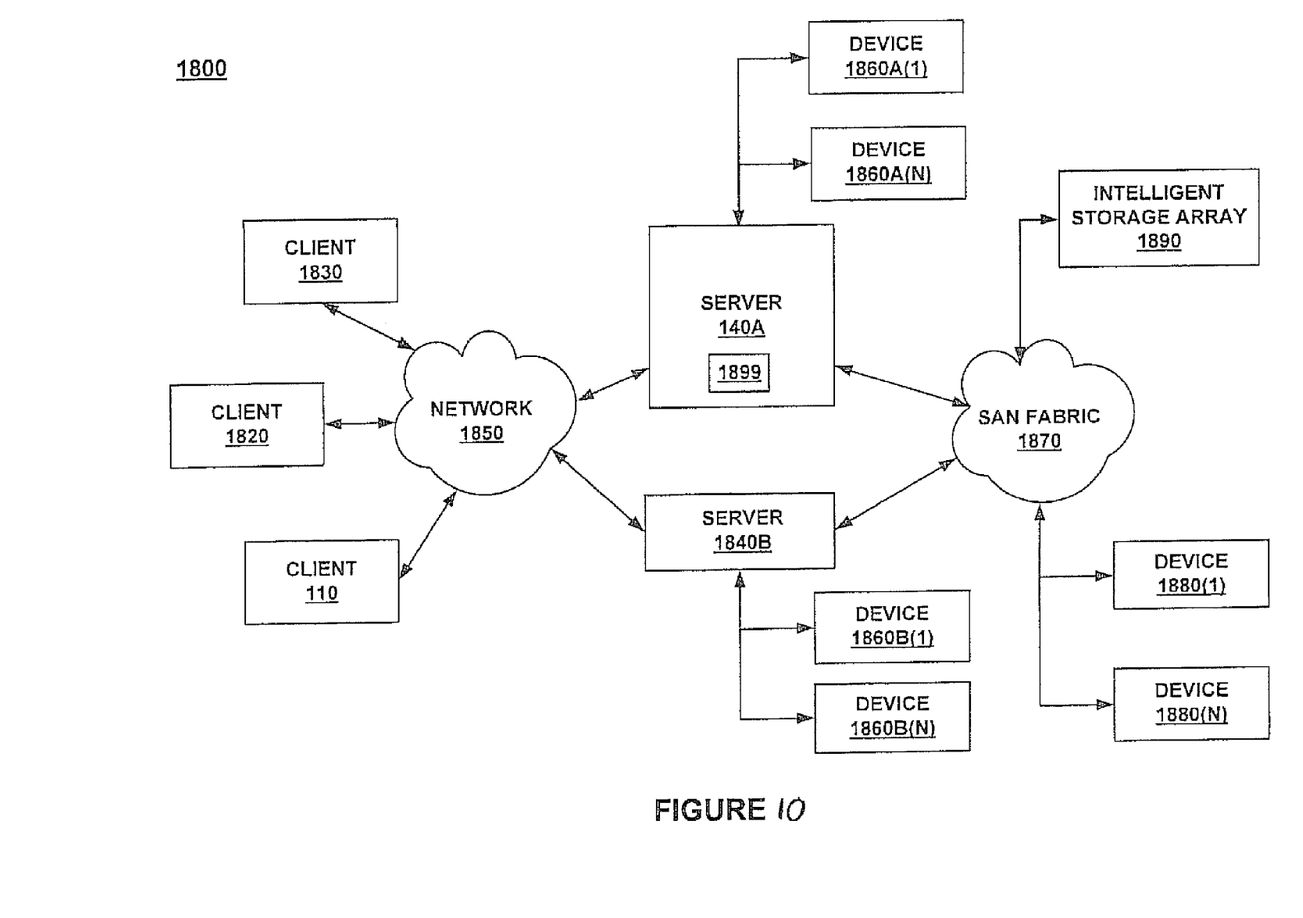
FIG. 10 is a block diagram depicting a network architecture in accordance with one embodiment of the present invention.

In one embodiment, a computer virus detection method (e.g., computer virus detection method 100, etc.) can be implemented on a network. FIG. 10 is a block diagram depicting a network architecture 1800 in which client systems 1810, 1820 and 1830, as well as storage servers 1840A and 1840B (any of which can be implemented using computer system 1110), are coupled to a network 1850. Storage server 1840A is further depicted as having storage devices 1860A (1)-(N) directly attached, and storage server 1840B is depicted with storage devices 1860B (1)-(N) directly attached. Storage servers 1840A and 1840B are also connected to a SAN fabric 1870, although connection to a storage area network is not required for operation of the disclosure. SAN fabric 1870 supports access to storage devices 1880(1)-(N) by storage servers 1840A and 1840B, and so by client systems 1810, 1820 and 1830 via network 1850. Intelligent storage array 1890 is also shown as an example of a specific storage device accessible via SAN fabric 1870. In one embodiment, server 1840A includes virus detection module 1899. In one embodiment, a virus detection module 1899 is similar to virus detection module 800. It is appreciated that present systems and methods are compatible with a variety of implementations. For example, portions of information and instructions associated with can be distributed in various resources.

Figure 11:
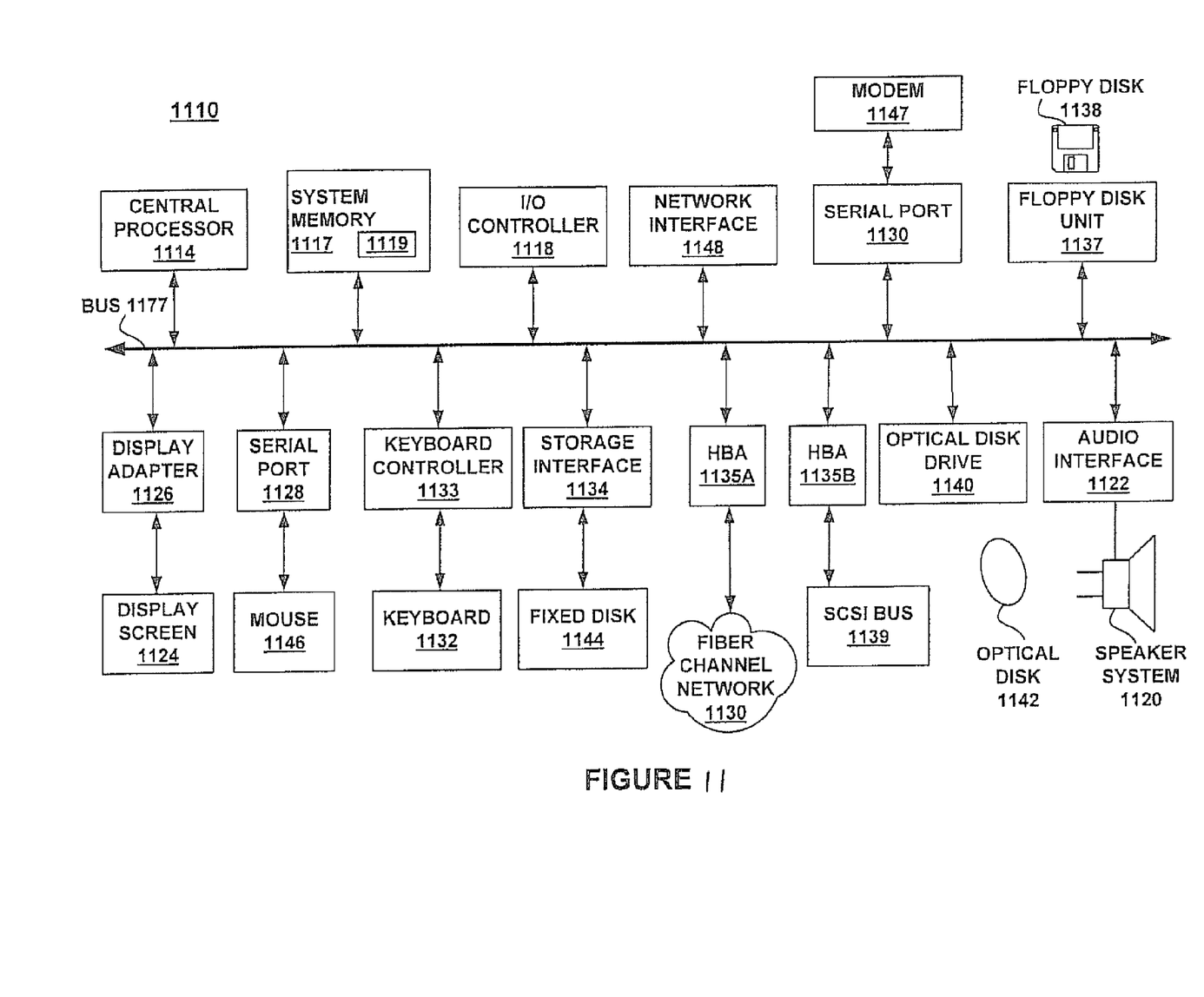
FIG. 11 depicts a block diagram of an exemplary computer system suitable for implementing the present methods in accordance with one embodiment of the present invention.

FIG. 11 depicts a block diagram of an exemplary computer system 1110 suitable for implementing the present methods. Computer system 1110 includes a bus 1177 which interconnects major subsystems of computer system 1110, such as a central processor 1114, a system memory 1117 (typically RAM, but which may also include ROM, flash RAM, or the like), an input/output controller 1118, an external audio device, such as a speaker system 1120 via an audio output interface 1122, an external device, such as a display screen 1124 via display adapter 1126, serial ports 1128 and 1130, a keyboard 1132 (interfaced with a keyboard controller 1133), a storage interface 1134, a floppy disk drive 1137 operative to receive a floppy disk 1138, a host bus adapter (HBA) interface card 1135A operative to connect with a Fiber Channel network 1190, a host bus adapter (HBA) interface card 1135B operative to connect to a SCSI bus 1139, and an optical disk drive 1140 operative to receive an optical disk 1142. Also included are a mouse 1146 or other point-and-click device (coupled to bus 1112 via serial port 1128), a modem 1147 (coupled to bus 1112 via serial port 1130), and a network interface 1148 (coupled directly to bus 1112).

Bus 1177 allows data communication between central processor 1114 and system memory 1117, which may include read-only memory (ROM) or flash memory (neither shown), and random access memory (RAM) (not shown), as previously noted. In one embodiment, instructions for performing a virus detection method (e.g., similar to virus detection method 100, etc.) are stored in one or more memories of computer system 1100 (e.g., in memory location 1119). The RAM is generally the main memory into which the operating system and application programs are loaded. In one embodiment, RAM 1117 includes a virus module (e.g., in memory location 1119). In one embodiment, a virus detection module stored in memory location 1119 is similar to virus detection module 800. The ROM or flash memory can contain, among other code, the Basic Input-Output system (BIOS) which controls basic hardware operation such as the interaction with peripheral components. Applications resident with computer system 1110 are generally stored on and accessed via a computer readable medium, such as a hard disk drive (e.g., fixed disk 1144), an optical drive (e.g., optical drive 1140), floppy disk unit 1137, or other storage medium. Additionally, applications can be in the form of electronic signals modulated in accordance with the application and data communication technology when accessed via network modem 1147 or interface 248.

Storage interface 1134, as with the other storage interfaces of computer system 1110, can connect to a standard computer readable medium for storage and/or retrieval of information, such as a fixed disk drive 1144. Fixed disk drive 1144 may be a part of computer system 1110 or may be separate and accessed through other interface systems. Modem 1147 may provide a direct connection to a remote server via a telephone link or to the Internet via an internet service provider (ISP). Network interface 1148 may provide a direct connection to a remote server via a direct network link to the Internet via a POP (point of presence). Network interface 1148 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 11 need not be present to practice the present disclosure. The devices and subsystems can be interconnected in different ways from that shown in FIG. 11. Code to implement the present disclosure can be stored in computer-readable storage media such as one or more of system memory 1117, fixed disk 1144, optical disk 1142, or floppy disk 1138. The operating system provided on computer system 1110 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

With reference to computer system 1110, modem 1147, network interface 1148 or some other method can be used to provide connectivity from each of client computer systems 1810, 1820 and 1830 to network 1850. Client systems 1810, 1820 and 1830 are able to access information on network addressable storage using, for example, a transfer coordination component, a web browser, or other client software (not shown). Such a client allows client systems 1810, 1820 and 1830 to access data hosted by storage server 1840 or 1880 or one of the corresponding storage devices. FIG. 11 depicts the use of a network such as the Internet for exchanging data, but the present disclosure is not limited to the Internet or any particular network-based environment.

Thus, the present systems and methods facilitate efficient and effective virus detection. In one embodiment, detection and handling of viruses can be performed independently with no or minimal coordination and reliance on external systems. In one exemplary implementation, virus detection can be performed without signature data or behavior data supplied from external sources. Present systems and methods can facilitate expedited virus detection and resolution without having to wait for development and distribution of virus data set information. Rapidly responding to potential threats facilitates reduction of potential undesirable adverse impacts (e.g., hijacking the system for nefarious uses, corrupting data, system hangs, etc.) that would otherwise affect system resources and performance. Performing all or a portion of the detection independently can also facilitate conservation of resources (e.g., reduced occupation of network resources communicating with a centralized data base, reduced maintenance of a centralized data base, etc.). Present systems and methods can also compliment existing infrastructures and facilitate development of new virus data sets.

Portions of the detailed description are presented and discussed in terms of a method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein. Some portions of the detailed description are presented in terms of procedures, steps, logic blocks, processing, and other symbolic representations of operations on data bits that can be performed within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "processing", "computing", "calculating", "determining", "displaying", "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices can include at least some form of computer readable media. Computer readable media can be any available media that can be accessed by a computing device. The computer readable medium can include reprogrammable non-transient tangible computer readable media. By way of example, and not limitation, computer readable medium may comprise computer storage media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies carrier waves or other transport mechanism and includes any information delivery media. By way of example, and not limitation, communication media includes wired media such as a wired network or direct-wired connection, and wireless media such as acoustic, RF, infrared, other wireless media, and combinations of any of the above.

Some embodiments may be described in the general context of computer-executable instructions, such as program modules, executed by one or more computers or other devices. Generally, program modules include routines, programs, objects, components, data structures, etc, that perform particular tasks or implement particular abstract data types. The functionality of the program modules may be combined or distributed as desired in various embodiments.

The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles and its practical application, to thereby enable others skilled in the art to best utilize the invention and various embodiments with various modifications as are suited to the particular use contemplated. It is intended that the scope be defined by the Claims appended hereto and their equivalents.

What is claimed is:

1. A computer virus detection method comprising:
   performing a virus analysis process, including:
      executing changes to a first and a second file in a virtual machine;
      comparing resulting behavior of executing said changes to said first file in said virtual machine to resulting behavior of executing said changes to said second file in said virtual machine; and executing said changes to said first and second files outside the virtual machine based upon receiving an indication from said virus analysis process that said first and second files are not infected;

wherein said first and second files are identified as potentially infected with a virus if said resulting behavior of executing said changes to said first file in said virtual machine shares common characteristics with said resulting behavior of executing said changes to said second file in said virtual machine.

2. The computer virus detection method of claim 1 wherein said performing said virus analysis process is performed in a system in which said changes to said first and second files occur.

3. The computer virus detection method of claim 1 wherein said first and second files are treated as potentially infected with a virus based upon said virus analysis process indicating behavior of both the first and second files share common characteristics.

4. The computer virus detection method of claim 1 wherein said first and second files are treated as potentially infected with a virus based upon said virus analysis indicating behavior of said first and second changed files and a process that directed said change share common characteristics.

5. The computer virus detection method of claim 1 wherein said examining said behavior includes examining system calls.

6. The computer virus detection method of claim 1 further comprising forwarding an outcome of said examining results for utilization in developing virus data sets.

7. A non-transitory computer readable storage medium having stored thereon computer executable instructions that, when executed by a computer system, cause the computer system to perform a method comprising:
    performing a virus analysis process, including:
        executing changes to a first and a second file in a virtual machine;
        comparing resulting behavior of executing said changes to said first file in said virtual machine to resulting behavior of executing said changes to said second file in said virtual machine; and
    executing said changes to said first and second files outside the virtual machine based upon receiving an indication from said virus analysis process that said file is first and second files are not infected;
    wherein said first and second files are identified as potentially infected with a virus if said resulting behavior of executing said changes to said first file in said virtual machine shares common characteristics with said resulting behavior of executing said changes to said second file in said virtual machine.

8. The non-transitory tangible computer readable storage medium of claim 7 wherein said performing said virus analysis process is performed in a system in which said changes to said first and second files occur.

9. The non-transitory tangible computer readable storage medium of claim 7 wherein said first and second files are treated as potentially infected with a virus based upon said virus analysis process indicating behavior of both the first and second files share common characteristics.

10. The non-transitory tangible computer readable storage medium of claim 7 wherein said first and second files are treated as potentially infected with a virus based upon said virus analysis indicating behavior of said first and second changed files and a process that directed said change share common characteristics.

11. The non-transitory tangible computer readable storage medium of claim 7 wherein said examining said behavior includes examining system calls.

12. The non-transitory tangible computer readable storage medium of claim 7 further comprising forwarding an outcome of said examining results for utilization in developing virus data sets.

13. A computer system, comprising:
    a computer system having a processor coupled to a non-transitory computer readable storage medium and executing computer readable code which causes the computer system to perform operations including:
        performing a virus analysis process, including:
            executing changes to a first and a second file in a virtual machine;
            comparing resulting behavior of executing said changes to said first file in said virtual machine to resulting behavior of executing said changes to said second file in said virtual machine; and
        executing said changes to said first and second files outside the virtual machine based upon receiving an indication from said virus analysis process that said file is first and second files are not infected;
        wherein said first and second files are identified as potentially infected with a virus if said resulting behavior of executing said changes to said first file in said virtual machine shares common characteristics with said resulting behavior of executing said changes to said second file in said virtual machine.

14. The computer system of claim 13 wherein said performing said virus analysis process is performed in a system in which said changes to said first and second files occur.

15. The computer system of claim 13 wherein said first and second files are treated as potentially infected with a virus based upon said virus analysis process indicating behavior of both the first and second files share common characteristics.

16. The computer system of claim 13 wherein said first and second files are treated as potentially infected with a virus based upon said virus analysis indicating behavior of said first and second changed files and a process that directed said change share common characteristics.

17. The computer system method of claim 13 further comprising forwarding an outcome of said examining results for utilization in developing virus data sets.

* * * * *